(12) United States Patent
Pak et al.

(10) Patent No.: US 8,299,352 B2
(45) Date of Patent: Oct. 30, 2012

(54) DYE-SENSITIZED SOLAR CELL USING CONDUCTIVE FIBER ELECTRODE

(75) Inventors: Hunkyun Pak, Daejeon (KR); Seungyup Lee, Kyungsangbuk-do (KR); Mangu Kang, Daejeon (KR); Yongseok Jun, Daejeon (KR); Hogyeong Yun, Seoul (KR); Jong Hyeok Park, Daejeon (KR); Jongdae Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 632 days.

(21) Appl. No.: 12/147,028

(22) Filed: Jun. 26, 2008

(65) Prior Publication Data

US 2009/0126784 A1  May 21, 2009

(30) Foreign Application Priority Data

Nov. 19, 2007 (KR) .................. 10-2007-0118065

(51) Int. Cl.
 *H01L 31/00* (2006.01)
(52) U.S. Cl. ......... 136/256; 136/252; 136/255; 136/263
(58) Field of Classification Search ................... 136/256, 136/255, 252, 263
 See application file for complete search history.

(56) References Cited

U.S. PATENT DOCUMENTS 6,069,313 A * 5/2000 Kay .............................. 136/249
6,538,194 B1 * 3/2003 Koyanagi et al. ............. 136/256
6,580,026 B1 * 6/2003 Koyanagi et al. ............. 136/263
6,913,713 B2 * 7/2005 Chittibabu et al. ......... 252/501.1
2008/0041446 A1 * 2/2008 Wu et al. ....................... 136/263

FOREIGN PATENT DOCUMENTS

| JP | 2000-243466 | * | 9/2000 |
| KR | 10-2005-0041707 | | 5/2005 |
| KR | 10-2005-0117041 | | 12/2005 |
| KR | 10-0648273 | | 11/2006 |

OTHER PUBLICATIONS

Minko et al. "Melting conditions for silicate glasses containing tin." Glass and Ceramics, vol. 30, n. 4, p. 243-246.*
Machine translation of JP2000-243466, pub. Sep. 2000.*
Brian O'Regan et al., "A low-cost, high-efficiency solar cell based on dye-sensitized colloidal $TiO_2$ films" Nature, vol. 353, Oct. 24, 1991, pp. 737-740.

* cited by examiner

*Primary Examiner* — Basia Ridley
*Assistant Examiner* — Allison Bourke
(74) *Attorney, Agent, or Firm* — Rabin & Berdo, P.C.

(57) ABSTRACT

Provided is a dye-sensitized solar cell including a flexible electrode. The dye-sensitized solar cell includes: first and second electrodes facing each other, and an electrolyte layer interposed between the first and second electrodes, wherein the first electrode comprises a structure formed of conductive fibers, a nano-particle semiconductor oxide layer formed on a surface of the structure of the conductive fibers, and dye molecules adsorbed in the nano-particle semiconductor oxide layer.

24 Claims, 3 Drawing Sheets

DYE-SENSITIZED SOLAR CELL USING CONDUCTIVE FIBER ELECTRODE

CROSS-REFERENCE TO RELATED PATENT APPLICATION

This application claims the benefit of Korean Patent Application No. 10-2007-0118065, filed on Nov. 19, 2007 in the Korean Intellectual Property Office, the disclosure of which is incorporated herein in its entirety by reference.

BACKGROUND OF THE INVENTION

1. Field of the Invention

The present invention relates to a solar cell, and more particularly, to a dye-sensitized solar cell having an electrode formed of a new material, so that the dye-sensitized solar cell has improved flexibility, processability, and efficiency.

The present invention is derived from a research project supported by the Information Technology (IT) Research & Development (R&D) program of the Ministry of Information and Communication (MIC) [2009-S-006-02, Component Module for Ubiquitous Terminal].

2. Description of the Related Art

A dye-sensitized solar cell is a new type of a low-cost solar cell that was developed in Switzerland in 1991 by a research team lead by Michael Gratzel of the Ecole Polytechnique Federale de Lausanne (EPFL). A dye-sensitized solar cell is based on a photoelectrochemical system including photosensitive dye molecules which can generate electrons by absorbing visible light, and a transition metal semiconductor oxide and an electrolyte which transfer the generated electrons to an electrode.

FIG. 1 is a schematic view of a dye-sensitized solar cell for explaining the operational principle of the dye-sensitized solar cell. Referring to FIG. 1, sunlight is incident through an anode 10 on dye molecules 22 which are present on a surface of titanium oxide ($TiO_2$) 21, which is a transition metal semiconductor oxide. Because the dye molecules 22 are very small, $TiO_2$ is used as a scaffold to retain a number of dye molecules in a 3-D medium with respect to a surface area of a given electric cell. A photon that reached the dye molecule 22 with sufficient energy to be absorbed excites the dye molecule 22 to an excited state, and thus the dye molecule 22 emits an electron ($e^-$). The electron ($e^-$) emitted from the dye molecule 22 is immediately injected into a conduction band of $TiO_2$ 21 and is moved to the anode 10 by a chemical diffusion gradient. Meanwhile, the dye molecule 22, which has lost one electron, oxidizes iodine ion ($I^-$) in an electrolyte 23 into a 3-iodine ion ($I_3^-$), thereby obtaining an electron. The 3-iodine ion ($I_3^-$) is diffused mechanically to a counter electrode 30 and regains there an electron, i.e., a counter electron coming through an external circuit.

The dye-sensitized solar cell is manufactured using a low-cost material via a simple manufacturing process, compared to a conventional silicon solar cell. Also, since the efficiency of the dye-sensitized solar cell is not much less than that of the silicon solar cell, many research studies have been performed to further develop dye-sensitized solar cells.

Meanwhile, as the application fields of solar cells have considerably expanded, flexible solar cells are in high demand. However, a conventional dye-sensitized solar cell includes an anode formed of a glass substrate, on a surface of which a conductive layer is formed, and when a nano-particle semiconductor oxide is attached/sintered thereon, the flexibility of glass is decreased, and thus, a bendable dye-sensitized solar cell cannot be realized. Thus, manufacturing and utilizing dye-sensitized solar cells have been difficult.

In order to address this problem, a thin metal substrate has been used as an electrode instead of the conductive glass substrate, as disclosed in Korean Patent Laid-Open Gazette No. 10-2005-0116869. However, according to this patent application, when the metal substrate is thin, the dye-sensitized solar cell is sufficiently flexible but the intensity thereof is decreased; and when the metal substrate is thick, the flexibility of the dye-sensitized solar cell is not great. Also, due to the low light transmittivity of a metal, an anode including a nano-particle semiconductor oxide should always be placed far away from a light source.

SUMMARY OF THE INVENTION

The present invention provides a dye-sensitized solar cell having great flexibility, intensity, and energy conversion efficiency, and whose mass manufacturing process is easy.

According to an aspect of the present invention, there is provided a dye-sensitized solar cell comprising: first and second electrodes facing each other, and an electrolyte layer interposed between the first and second electrodes, wherein the first electrode comprises a structure formed of conductive fibers, a nano-particle semiconductor oxide layer formed on a surface of the structure of the conductive fiber, and dye molecules adsorbed in the nano-particle semiconductor oxide layer.

The conductive fibers may have light transmittivity and electrical conductivity.

The conductive glass fiber may contain tin (Sn). A surface of the conductive glass fiber containing Sn may be coated with a fluorinated tin oxide (FTO) or indium tin oxide (ITO).

The conductive fiber may comprise carbon fiber. The conductive fiber may comprise a conductive polymer fiber.

The structure formed of conductive fibers may be a stack structure of conductive fibers. The structure formed of conductive fibers may be a textile structure knitted with conductive fibers.

The second electrode may be bendable. The second electrode may comprise a conductive substrate coated with a platinum layer. The second electrode may have a carbon content of 95-100%. The second electrode may comprise a polymer material coated or deposited with a conductive material. The polymer material may be a material selected from the group consisting of polyethyleneterephthalate, polycarbonate, polyimide, polyethylene naphthalate, polyethersulfone, polyethylene, and polypropylene.

The electrolyte may be liquid at a room temperature. The electrolyte may be solid or in a gel state at a room temperature.

The nano-particle semiconductor oxide layer may comprise titanium oxide ($TiO_2$), zinc oxide (ZnO), or niobe pentoxide ($Nb_2O_5$).

The dye molecule may comprise a ruthenium (Ru) complex compound. The dye molecule may comprise thiophene, phthalocyanine, porpyrine, indolin, or quinoline, or an organic material including a derivative of one of these.

The dye-sensitized solar cell may further comprise an insulating thin layer or a semiconductor thin film in the electrolyte layer between the first and second electrodes.

The dye-sensitized solar cell may further comprise a transparent layer formed on the structure formed of conductive fibers.

Since a conductive fiber is used as a conductive layer of a semiconductor electrode, the contact surface between the conductive fiber and the nano-particle semiconductor oxide layer is increased, thus making the transition path of electrons short, and consequently, more light can be absorbed by making the electrode layer thick. Thus the energy conversion efficiency can be increased significantly. Also, the flexibility and the formability of the dye-sensitized solar cell can be increased based on the flexibility and formability of the conductive fiber which forms the electrode layer.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
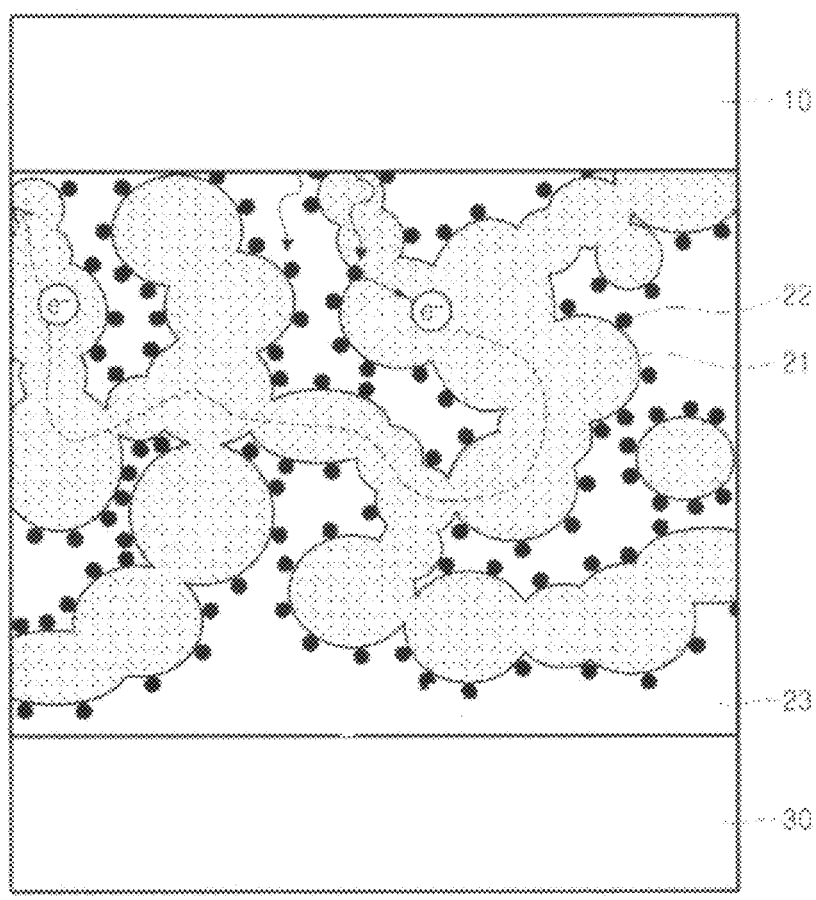
FIG. 1 is a schematic view of a dye-sensitized solar cell for explaining the operational principle of a dye-sensitized solar cell.

The present invention will now be described more fully with reference to the accompanying drawings, in which exemplary embodiments of the invention are shown. The invention may, however, be embodied in many different forms and should not be construed as being limited to the embodiments set forth herein; rather, these embodiments are provided so that this disclosure will be thorough and complete, and will fully convey the concept of the invention to those skilled in the art. In the drawings, the thicknesses of layers and regions are exaggerated for clarity. Like reference numerals throughout this specification denote like elements.

Figure 2:
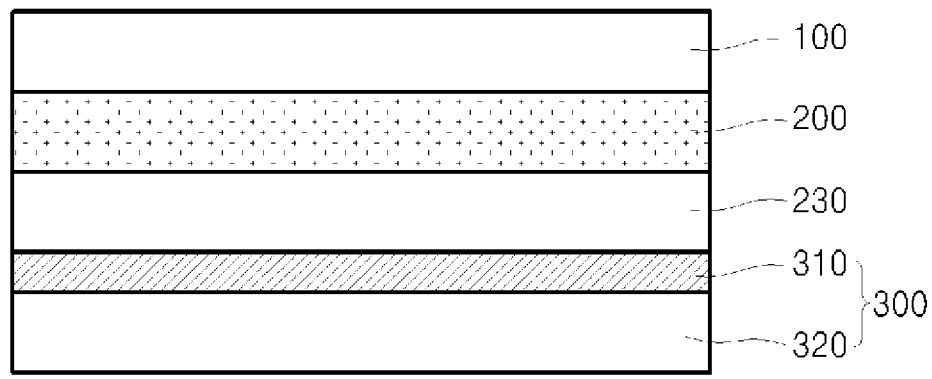
FIG. 2 is a cross-sectional view of the structure of an electrode of a dye-sensitized solar cell according to an embodiment of the present invention.

FIG. 2 is a cross-sectional view of the structure of an electrode of a dye-sensitized solar cell according to an embodiment of the present invention. Referring to FIG. 2, the dye-sensitized solar cell includes a semiconductor electrode 200, a counter electrode 300, and an electrolyte layer 230 interposed therebetween. The semiconductor electrode 200 has a structure in which a nano-particle semiconductor oxide layer is attached on a conductive fiber, which is a conductive layer. A transparent layer 100 is formed on the semiconductor electrode 200. A terminal (not shown) through which the dye-sensitized solar cell is connected to an external circuit is formed at the semiconductor electrode 200 and the counter electrode 300. Although the electrolyte layer 230 is illustrated to be separated from the semiconductor electrode 200, the electrolyte layer 230 and the semiconductor electrode 200 may be formed as one body. An electrolyte in the electrolyte layer 230 is usually liquid at room temperature, however, it may also be solid or in a gel state. The counter electrode 300 may also be formed of a flexible, bendable material in accordance with the flexibility of the semiconductor electrode 200 formed of a conductive fiber. The counter electrode 300 may be formed of a conductive substrate on which a platinum layer is coated, or a carbon electrode having a carbon content of 95% or more. Alternatively, the counter electrode 300 may be formed of a polymer on which a conductive material is coated or deposited. Examples of the polymer include polyethyleneterephthalate, polycarbonate, polyimide, polyethylene naphthalate, polyethersulfone, polyethylene, and polypropylene.

Figure 3:
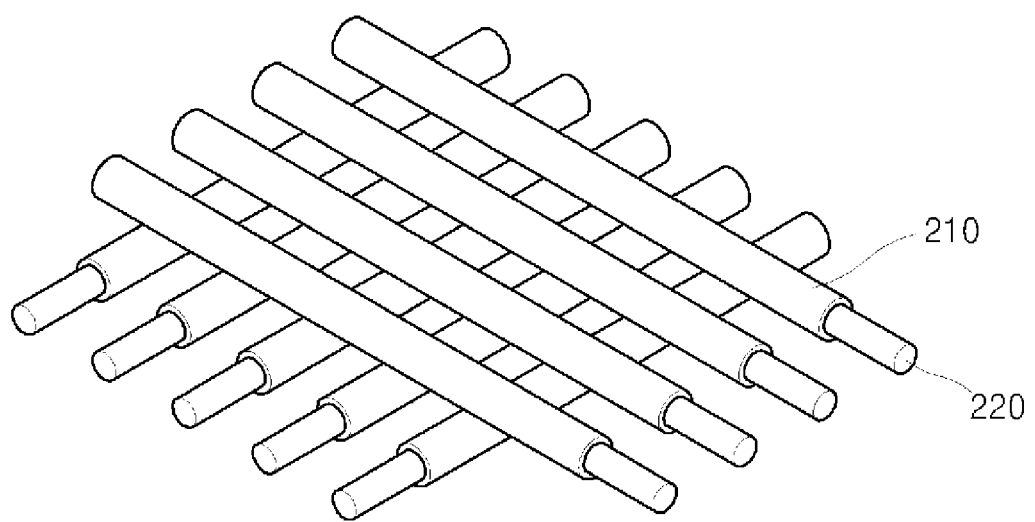
FIG. 3 is a schematic view of the structure of a semiconductor electrode according to an embodiment of the present invention.
Figure 4:
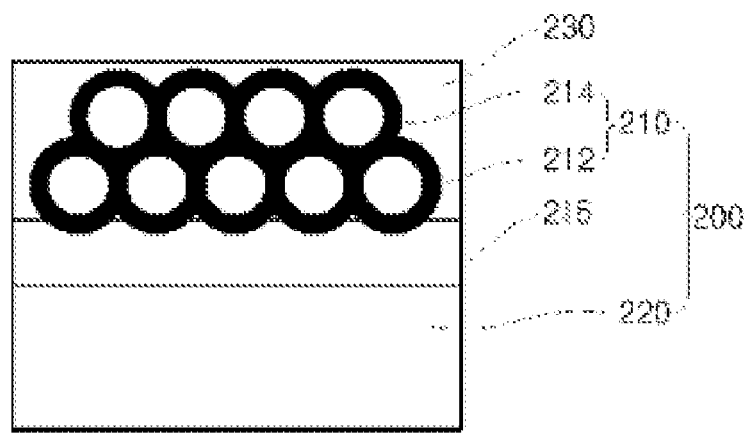
FIG. 4 is a cross-sectional view of an interface between a conductive fiber and a nano-particle semiconductor oxide layer.

FIG. 3 is schematic view of the structure of a semiconductor electrode 200 comprising a plurality of conductive fibers 220 and a plurality of nano-particle semiconductor oxide layers 210 respectively sintered on a surface of each of the conductive fibers 220. FIG. 4 is a cross-sectional view of an interface between the conductive fiber 220 and a nano-particle semiconductor oxide layer 210. Referring to FIGS. 3 and 4, the semiconductor electrode 200 of the dye-sensitized solar cell according to the current embodiment of the present invention includes the conductive fiber 220 having a thickness of several micrometers to millimeters as a conductive layer. A nano-particle semiconductor oxide 212 having a size of several to several hundreds nanometers is sintered on a surface of the conductive fiber 220, and a dye 214 for a dye-sensitized solar cell dye is absorbed on a surface of the nano-particle semiconductor oxide 212. Also, in order to reduce the possibility that the conductive fiber 220 may directly contact the electrolyte 230 and thus an electron generated thereby is rebounded with an electrolyte, a separate thin semiconductor oxide layer 212 may be selectively formed between the conductive fiber 220 and the nano-particle semiconductor oxide layer 212. The nano-particle semiconductor oxide 212 on which the dye 214 is absorbed is denoted with a reference numeral 210. The nano-particle semiconductor oxide 212, and the metal oxide layer 216, which may be selectively present, may be formed of a material such as titanium dioxide ($TiO_2$), tin oxide ($SnO_2$), or zinc oxide (ZnO), and the dye 214 may include a ruthenium (Ru) complex compound. Alternatively, the dye 214 may be thiophene, phthalocyanine, porphyrine, indoline, or quinoline, or an organic material including a derivative of one of these. The conductive fiber 220 may be a conductive glass fiber having good light transmittivity.

Figure 5:
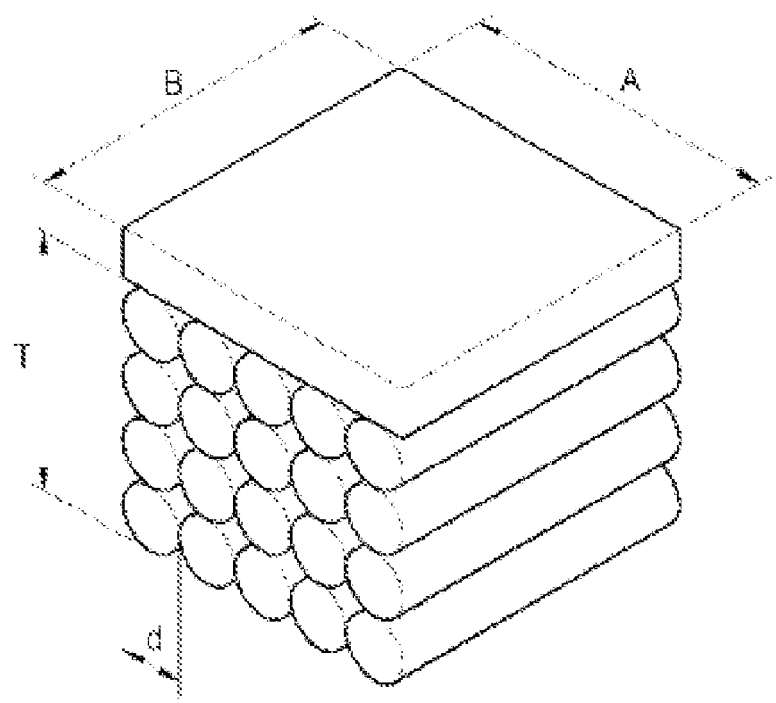
FIG. 5 is a schematic view of a stack structure of a conductive fiber according to an embodiment of the present invention.

An example of the stack structure of a conductive fiber is schematically illustrated in FIG. 5. In FIG. 5, the stack structure of a conductive fiber has a width A, a length B, and a thickness T, and includes stacked conductive glass fibers having a diameter d. A conductive layer formed of the stack structure of conductive fibers as illustrated in FIG. 5 has a larger surface area on which nano-particle semiconductors can be sintered, compared to a planar conductive layer.

Hereinafter, surface areas of the stack structure of a conductive fiber and a planar conductive layer will be compared. First, in the case of a planar conductive layer having a width A, a length B, and a thickness T, a surface area which a nano-particle semiconductor oxide can contact is AB, which is an area of a surface of a conductive layer. On the other hand, when conductive fibers having a diameter d are stacked in the same space, a surface area which a nano-particle semiconductor oxide can contact is approximately $(T/d) \times (A/d) \times (\pi d) \times B = A \times B \times (T/d) \times \pi$, according to the surface area of each conductive fiber. Accordingly, the smaller the diameter of a conductive fiber with respect to an identical volume, the larger the surface area of the stack structure of a conductive fiber. When the surface area of the stack structure of a conductive fiber, for example, the stack structure of glass fiber, is increased, the contact area between the glass fiber and the nano-particle semiconductor oxide is increased, and thus photoelectrons generated from a dye molecule can easily move to a conductive layer of a semiconductor electrode via the nano-particle semiconductor oxide. Consequently, the efficiency of the dye-sensitized solar cell can be increased.

As described above, the smaller the thickness of the conductive fiber, the better. However, if the thickness of the conductive fiber is too small, it is difficult to manufacture the conductive fiber. Thus, the thickness of the conductive fiber may preferably be several micrometers to millimeters, which is the thickness of conductive fibers that are mass-produced in the current glass fiber industry.

Thus, when a conductive fiber is used as an anode conductive layer, the path between the nano-particle semiconductor and the conductive layer is rapidly reduced, thereby increasing the efficiency of a solar cell. The conductive fiber may be formed of a glass fiber coated with fluorinated tin oxide (FTO) or indium tin oxide (ITO), or a glass cotton or a textile knitted with a glass fiber or a stack structure formed of these materials.

Also, a carbon fiber which has lower light transmittivity but good electric conductivity may be used as a conductive fiber in the present invention. However, when a fibrous material having low light transmittivity is used as an anode material in which nano semiconductor particles are fixed, the thickness of the stack structure thereof may be limited.

Glass fibers or carbon fibers, which are frequently used for a fiber glass reinforced plastic (FRP), are light, and have great intensity and excellent processability at the same time. Accordingly, dye-sensitized solar cells having a conductive glass fiber as a sintering base material for a nano-particle semiconductor can be manufactured for various products such as electronic products, clothing, automobiles, ships, or airplanes, etc. Also, since bendable products can be manufactured by including the dye-sensitized solar cell, the dye-sensitized solar cells can be applied in various fields.

The dye-sensitized solar cell according to the present invention has excellent processability and intensity, is light, and can be easily applied in various fields, compared to a conventional solar cell. Particularly, when using a conductive fiber having great transmittivity, the thickness of a conductive layer can be increased, and thus the surface area of an anode, on which the nano-particle semiconductor can be fixed, can be increased significantly. Thus, a dye-sensitized solar cell having high energy efficiency can be manufactured.

EMBODIMENT

Referring to FIGS. 2 and 4, the current embodiment of the present invention will be described in more detail.

The semiconductor electrode 200 according to the current embodiment of the present invention has a structure in which a conductive layer, in which glass fibers that are surface-treated with ITO or $SnO_2$ and have a diameter of 10-100 μm are stacked, is covered with a nano-particle semiconductor oxide layer 212 formed of $TiO_2$ having a size of about 15-25 nm. Dye molecules 214 formed of ruthenium (Ru) complex compound are adsorbed on a surface of the nano-particle semiconductor oxide layer 212. The semiconductor electrode 200 is covered by an electrolyte solution 230. The electrolyte solution 230 may be an iodine based oxidization-reduction liquid electrolyte, for example, an $I_3^-/I^-$ electrolyte solution in which 1-vinyl-3-hexyl-imidazolium iodide of 0.7 M, LiI of 0.1 M, and iodine ($I_2$) of 40 mM are dissolved in 3-methoxypropionitrile.

The counter electrode 300 may have a structure in which a platinum layer 310 is coated on a conductive substrate 320, for example, a transparent glass substrate coated with ITO or $SnO_2$. The platinum layer 310 of the counter electrode 300 is disposed to face the semiconductor electrode 200. On the opposite side of the semiconductor electrode 300, a transparent layer 100 is disposed for protecting the electrolyte solution 230. An insulating membrane or a semiconductor thin layer (not shown), which allows ion penetration trough the membrane or thin film, may be further formed between the semiconductor electrode 200 and the counter electrode 300, and the insulating thin layer or the semiconductor layer may prevent a short circuit between the semiconductor electrode 200 and the counter electrode 300. The transparent layer 100 may prevent leakage of the electrolyte solution 230.

The dye-sensitized solar cell according to the current embodiment of the present invention is operated in the following manner. Incident light passes through the transparent layer 100 and is absorbed into the dye molecules 214 adsorbed on the nano-particle semiconductor oxide layer 212 in the semiconductor electrode 200. Then, the dye molecules 214 are excited, thereby injecting an electron into a conduction band of the nano-particle semiconductor oxide layer 212. The electron injected into the nano-particle semiconductor oxide layer 212 is transferred to a conductive fiber 220, which is a conductive layer contacting the nano-particle semiconductor oxide layer 212 the nono- and is moved to the counter electrode 300 via an external circuit (not shown).

Meanwhile, the dye molecules 214 that are oxidized as a result of electron transition respectively receive an electron that is provided by an oxidization-reduction ($3I^- \rightarrow I_3^- + 2e^-$) of an iodine ion in the electrolyte solution 230 and thus is reduced again. The oxidized iodine ion ($I_3^-$) is reduced again by an electron that has arrived at the counter electrode 300.

For sunlight that is incident to the dye-sensitized solar cell according to the present invention, the transition path of electrons is not extended due to the increased contact surface between the conductive fiber and the nano-particle semiconductor oxide layer 212. Accordingly, since more sunlight can be absorbed using a thicker electrode layer, which has more dye molecules, the energy efficiency of the dye-sensitized solar cell can be increased significantly in the present invention. Also, besides the increment of the energy efficiency of the dye-sensitized solar cell, the flexibility and the formability of the dye-sensitized solar cell can be increased due to the flexibility and the formability of a conductive fiber such as conductive glass fiber or carbon fiber, forming an electrode layer. A While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A dye-sensitized solar cell comprising a first electrode, a second electrode, and an electrolyte layer, wherein:

the first electrode comprises a structure formed of a plurality of conductive fibers, a plurality of nano-particle semiconductor oxide layers, and dye molecules adsorbed in the nano-particle semiconductor oxide layers;

a respective one of the plurality of nano-particle semiconductor oxide layers is formed on a corresponding one of the plurality of conductive fibers;

the electrolyte layer includes a first part and a second part, the first part being disposed between the first and second electrodes, the second part being disposed within a gap between the plurality of conductive fibers;

each conductive fiber extends in a direction perpendicular to a thickness direction of the second electrode; and the plurality of conductive fibers collectively operate as a conductive layer of the first electrode.

2. The dye-sensitized solar cell of claim 1, wherein the conductive fibers have a thickness of several micrometers to several millimeters.

3. The dye-sensitized solar cell of claim 1, wherein the conductive fibers have light transmittivity and electrical conductivity.

4. The dye-sensitized solar cell of claim 1, wherein the conductive fibers include a conductive glass fiber.

5. The dye-sensitized solar cell of claim 4, wherein the conductive glass fiber contains tin (Sn).

6. The dye-sensitized solar cell of claim 5, wherein a surface of the conductive glass fiber containing Sn is coated with a fluorinated tin oxide (FTO) or indium tin oxide (ITO).

7. The dye-sensitized solar cell of claim 1, wherein the conductive fiber comprises carbon fiber.

8. The dye-sensitized solar cell of claim 1, wherein the conductive fiber comprises a conductive polymer fiber.

9. The dye-sensitized solar cell of claim 1, wherein the plurality of conductive fibers collectively form a stack structure which includes a first row having a first number of conductive fibers and a second row having a second number of conductive fibers disposed on the first row, each conductive fiber being apart from an adjacent conductive fiber.

10. The dye-sensitized solar cell of claim 1, wherein the structure formed of conductive fibers is a textile structure knitted with conductive fibers.

11. The dye-sensitized solar cell of claim 1, wherein the second electrode is bendable.

12. The dye-sensitized solar cell of claim 11, wherein the second electrode comprises a conductive substrate coated with a platinum layer.

13. The dye-sensitized solar cell of claim 11, wherein the second electrode has a carbon content of 95-100%.

14. The dye-sensitized solar cell of claim 11, wherein the second electrode comprises a polymer material coated or deposited with a conductive material.

15. The dye-sensitized solar cell of claim 14, wherein the polymer material is a material selected from the group consisting of polyethyleneterephthalate, polycarbonate, polyimide, polyethylene naphthalate, polyethersulfone, polyethylene, and polypropylene.

16. The dye-sensitized solar cell of claim 1, further comprising an insulating thin layer or a semiconductor thin film in the electrolyte layer between the first and second electrodes.

17. The dye-sensitized solar cell of claim 1, wherein the electrolyte layer is formed of an electrolyte that is liquid at ambient room temperature.

18. The dye-sensitized solar cell of claim 1, wherein the electrolyte layer is formed of an electrolyte that is solid or in a gel state at a ambient room temperature.

19. The dye-sensitized solar cell of claim 1, wherein the nano-particle semiconductor oxide layer comprises titanium oxide ($TiO_2$), zinc oxide (ZnO), or niobe pentoxide ($Nb_2O_5$).

20. The dye-sensitized solar cell of claim 1, wherein the dye molecule comprises a ruthenium (Ru) complex compound.

21. The dye-sensitized solar cell of claim 1, wherein the dye molecule comprises thiophene, phthalocyanine, porpyrine, indolin, or quinoline, or an organic material including a derivative of one of these.

22. The dye-sensitized solar cell of claim 1, further comprising a transparent layer formed on the structure formed of conductive fibers, wherein the plurality of conductive fibers are disposed between the transparent layer and the second electrode.

23. The dye-sensitized solar cell of claim 1, wherein the second part of the electrolyte layer fills a gap between two adjacent nano-particle semiconductor oxide layers each of which is formed on a surface of each of two adjacent conductive fibers.

24. The dye-sensitized solar cell of claim 1, wherein each of said plurality of conductive fibers has a shape of rod that is circumferentially surrounded by a corresponding one of the plurality of nano-particle semiconductor oxide layers.

* * * * *